US012606776B2

(12) United States Patent
Saveyn et al.

(10) Patent No.: US 12,606,776 B2
(45) Date of Patent: Apr. 21, 2026

(54) LIQUID HAND DISHWASHING DETERGENT COMPOSITION COMPRISING A CATIONICALLY MODIFIED INULIN

(71) Applicant: The Procter & Gamble Company, Cincinnati, OH (US)

(72) Inventors: Pieter Jan Maria Saveyn, Heusden Destelbergen (BE); Evelyne Johanna Lutgarde Van Hecke, Bachte-Maria-Leerne (BE)

(73) Assignee: The Procter & Gamble Company, Cincinnati, OH (US)

( * ) Notice: Subject to any disclaimer, the term of this patent is extended or adjusted under 35 U.S.C. 154(b) by 374 days.

(21) Appl. No.: 18/105,345

(22) Filed: Feb. 3, 2023

(65) Prior Publication Data

US 2023/0272308 A1 Aug. 31, 2023

(30) Foreign Application Priority Data

Feb. 11, 2022 (EP) .................................... 22156234

(51) Int. Cl.
*C11D 1/94* (2006.01)
*C11D 1/62* (2006.01)
*C11D 1/88* (2006.01)
*C11D 3/34* (2006.01)
*C11D 17/00* (2006.01)

(52) U.S. Cl.
CPC .............. *C11D 3/3409* (2013.01); *C11D 1/62* (2013.01); *C11D 1/88* (2013.01); *C11D 17/0013* (2013.01)

(58) Field of Classification Search
CPC ........... C11D 1/12; C11D 1/143; C11D 1/146; C11D 1/29; C11D 1/28; C11D 1/886; C11D 1/90; C11D 1/94; C11D 3/0094; C11D 3/222; C11D 2111/14
See application file for complete search history.

(56) References Cited

U.S. PATENT DOCUMENTS

| | | | | |
|---|---|---|---|---|
| 2002/0082399 | A1* | 6/2002 | Kuzee | C08B 37/0051 536/120 |
| 2017/0165165 | A1* | 6/2017 | Zhao | A61K 8/046 |
| 2018/0119055 | A1 | 5/2018 | Raaijmakers | |
| 2018/0265825 | A1* | 9/2018 | Park | C11D 1/83 |
| 2021/0007958 | A1* | 1/2021 | Scheele | A61K 8/466 |
| 2021/0371773 | A1* | 12/2021 | Brandt | C12N 9/1048 |
| 2022/0168192 | A1* | 6/2022 | Battermann | A61K 8/466 |
| 2022/0401316 | A1* | 12/2022 | Gruber | A61K 35/747 |

FOREIGN PATENT DOCUMENTS

| | | | |
|---|---|---|---|
| EP | 3536384 | * | 9/2019 |
| EP | 3536384 | A1 | 9/2019 |
| WO | 2012116471 | A1 | 9/2012 |

OTHER PUBLICATIONS

16189F Extended EP Search Report and Written Opinion for 22156234.1 dated Sep. 9, 2022, 05 pages.

* cited by examiner

*Primary Examiner* — Charles I Boyer
(74) *Attorney, Agent, or Firm* — Kathleen Y. Carter; Melissa G. Krasovec

(57) ABSTRACT

A liquid hand dishwashing detergent composition containing a cationically modified inulin compound, methods of making the liquid hand dishwashing detergent compositions, and methods of using said liquid hand dishwashing detergent compositions, which provide improved rinsing, solution feel, and finished product viscosity control.

19 Claims, No Drawings

LIQUID HAND DISHWASHING DETERGENT COMPOSITION COMPRISING A CATIONICALLY MODIFIED INULIN

FIELD OF THE INVENTION

The invention relates to liquid hand dishwashing detergent compositions containing a cationically modified inulin compound, methods of making the liquid hand dishwashing detergent compositions, and methods of using said liquid hand dishwashing detergent compositions, which provide improved rinsing, solution feel, and finished product viscosity control.

BACKGROUND OF THE INVENTION

During manual dishwashing, efficient foaming and rinsing of the foam is important for consumers. Long lasting foam signals product effectiveness to the consumer, while easy rinsing of the foam enables faster rinsing and the use of less water by the consumer during the washing cycle. Consumers also desire a dishwashing detergent composition that effectively cleans dishes without leaving behind any residue. To provide these foaming and cleaning benefits, formulators of hand dishwashing detergent compositions have traditionally formulated with anionic surfactants, including alkyl sulphate anionic surfactants. However, a drawback to these anionic surfactants, including alkyl sulphate anionic surfactants, is sacrificing foam rinsing properties. Formulators have also formulated liquid hand dishwashing detergent compositions with cationically modified hydroxyethyl cellulose (catHEC) to provide skin care benefits. Cationically modified hydroxyethyl cellulose has now also been found to provide efficient foam rinsing. However, cationically modified hydroxyethyl cellulose also has several drawbacks, including an increase in finished product viscosity and solution feel negatives, for example, giving the wash solution a slippery feel. Accordingly, there is a need for a liquid detergent composition that provides rinse benefits, without adversely affecting (or even while improving) other benefits, such as finished product viscosity control and solution feel. There is also increasing consumer demand for cleaning products that are more biodegradable, renewable, biobased, or natural.

Surprisingly, it has been found that formulating liquid hand dishwashing detergent compositions containing cationically modified inulin compounds balances the need for efficient rinsing and acceptable solution feel with the need for acceptable finished product viscosity control.

SUMMARY OF THE INVENTION

The present disclosure relates to a liquid hand dishwashing detergent composition comprising a. from about 5.0% to about 50% by weight of the liquid hand dishwashing detergent composition of a surfactant system, where the surfactant system comprises i. an anionic surfactant selected from the group consisting of alkyl sulphate surfactant, alkyl alkoxy sulphate surfactant, alkyl sulphonate surfactant, alkyl sulphosuccinate and dialkyl sulphosuccinate ester surfactants, and mixtures thereof; ii. a co-surfactant selected from the group consisting of amphoteric co-surfactant, zwitterionic co-surfactant, and mixtures thereof; and b. a cationically modified inulin compound.

DETAILED DESCRIPTION OF THE INVENTION

Formulating the liquid cleaning composition with a surfactant system and a cationically modified inulin compound, as described herein, has been found to result in improved rinsing, while also providing improved solution feel and finished product viscosity control, contrary to cationic celluloses, for example.

As used herein, articles such as “a” and “an” when used in a claim, are understood to mean one or more of what is claimed or described.

The term “comprising” as used herein means that steps and ingredients other than those specifically mentioned can be added. This term encompasses the terms “consisting of” and “consisting essentially of” The compositions of the present invention can comprise, consist of, and consist essentially of the essential elements and limitations of the invention described herein, as well as any of the additional or optional ingredients, components, steps, or limitations described herein.

The term “dishware” as used herein includes cookware and tableware made from, by non-limiting examples, ceramic, china, metal, glass, plastic (e.g., polyethylene, polypropylene, polystyrene, etc.) and wood.

The term “grease” or “greasy” as used herein means materials comprising at least in part (i.e., at least 0.5 wt % by weight of the grease in the material) saturated and unsaturated fats and oils, preferably oils and fats derived from animal sources such as beef, pig and/or chicken.

The terms “include”, “includes” and “including” are meant to be non-limiting.

The term “particulate soils” as used herein means inorganic and especially organic, solid soil particles, especially food particles, such as for non-limiting examples: finely divided elemental carbon, baked grease particle, and meat particles.

As used herein, the term “polysaccharide” means a polymeric carbohydrate molecule composed of long chains of monosaccharide units bound together by glycosidic linkages and on hydrolysis gives the constituent monosaccharides or oligosaccharides.

A “cationic derivative of a polysaccharide” is understood to be a polysaccharide or a derivate of a polysaccharide comprising a cationic group. The cationic group may comprise an ammonium group, a quaternary ammonium group, a sulfonium group, a phosphonium group, a transitional metal or any other positively charged functional group. A preferred cationic group is a quaternary ammonium group.

The term “sudsing profile” as used herein refers to the properties of a cleaning composition relating to suds character during the dishwashing process. The term “sudsing profile” of a cleaning composition includes initial suds volume generated upon dissolving and agitation, typically manual agitation, of the cleaning composition in the aqueous washing solution, and the retention of the suds during the dishwashing process. Preferably, hand dishwashing cleaning compositions characterized as having “good sudsing profile” tend to have high initial suds volume and/or sustained suds volume, particularly during a substantial portion of or for the entire manual dishwashing process. This is important as the consumer uses high suds as an indicator that enough cleaning composition has been dosed. Moreover, the consumer also uses the sustained suds volume as an indicator that enough active cleaning ingredients (e.g., surfactants) are present, even towards the end of the dishwashing process. The consumer usually renews the washing solution when the sudsing subsides. Thus, a low sudsing cleaning composition will tend to be replaced by the consumer more frequently than is necessary because of the low sudsing level.

“Easy rinsing” or “an easy rinsing profile” means that the foam generated during the main wash cycle can be rinsed faster and less water can be used to collapse the foam from the main wash cycle. Faster collapsing of the foam is preferred to reduce the amount of time spent rinsing and overall washing time, as well. Reducing the amount of water used to collapse the foam is preferred because it aids in water conservation.

It is understood that the test methods that are disclosed in the Test Methods Section of the present application must be used to determine the respective values of the parameters of Applicants' inventions as described and claimed herein.

All percentages are by weight of the total composition, as evident by the context, unless specifically stated otherwise. All ratios are weight ratios, unless specifically stated otherwise, and all measurements are made at 25° C., unless otherwise designated.

Liquid Cleaning Composition

The cleaning composition is a liquid cleaning composition, preferably a liquid hand dishwashing cleaning composition, and hence is in liquid form. The liquid cleaning composition is preferably an aqueous cleaning composition. As such, the composition can comprise from 50% to 85%, preferably from 50% to 75%, by weight of the total composition of water.

The liquid cleaning composition may have a pH greater than 6.0, or a pH of from 6.0 to 12.0, preferably from 7.0 to 11.0, more preferably from 8.0 to 10.0, measured as a 10% aqueous solution in demineralized water at 20° C.

The liquid cleaning composition of the present invention can be Newtonian or non-Newtonian, preferably Newtonian. Preferably, the composition has a viscosity of from 10 mPa·s to 10,000 mPa·s, preferably from 100 mPa·s to 5,000 mPa·s, more preferably from 300 mPa·s to 2,000 mPa·s, or most preferably from 500 mPa·s to 1,500 mPa·s, alternatively combinations thereof.

Surfactant System

The liquid cleaning composition comprises from 5.0% to 50%, preferably from 6.0% to 40%, most preferably from 15% to 35%, by weight of the total composition of a surfactant system.

Anionic Surfactant

The surfactant system comprises an anionic surfactant. The surfactant system can comprise at least 50%, preferably from 60% to 90%, more preferably from 65% to 85% by weight of the surfactant system of the anionic surfactant. The surfactant system is preferably free of fatty acid or salt thereof, since such fatty acids impede the generation of suds.

Suitable anionic surfactants can be selected from the group consisting of: alkyl sulphate surfactant, alkyl alkoxy sulphate surfactant, alkyl sulphonate surfactant, alkyl sulphosuccinate and dialkyl sulphosuccinate ester surfactants, and mixtures thereof.

The anionic surfactant can comprise at least 70%, preferably at least 85%, more preferably 100% by weight of the anionic surfactant of alkyl sulphate anionic surfactant, alkyl alkoxy sulphate anionic surfactant, or a mixture thereof.

The mol average alkyl chain length of the alkyl sulphate anionic surfactant or the alkyl alkoxy sulphate anionic surfactant can be from 8 to 18, preferably from 10 to 14, more preferably from 12 to 14, most preferably from 12 to 13 carbon atoms, in order to provide a combination of improved grease removal and enhanced speed of cleaning.

The alkyl chain of the alkyl sulphate anionic surfactant or the alkyl alkoxy sulphate anionic surfactant can have a mol fraction of C12 and C13 chains of at least 50%, preferably at least 65%, more preferably at least 80%, most preferably at least 90%. Suds mileage is particularly improved, especially in the presence of greasy soils, when the C13/C12 mol ratio of the alkyl chain is at least 57/43, preferably from 60/40 to 90/10, more preferably from 60/40 to 80/20, most preferably from 60/40 to 70/30, while not compromising suds mileage in the presence of particulate soils.

The relative molar amounts of C13 and C12 alkyl chains in the alkyl sulphate anionic surfactant or the alkyl alkoxy sulphate anionic surfactant can be derived from the carbon chain length distribution of the surfactants. The carbon chain length distributions of the alkyl chains of the alkyl sulphate and alkyl alkoxy sulphate surfactants can be obtained from the technical data sheets from the suppliers for the surfactant or constituent alkyl alcohol. Alternatively, the chain length distribution and average molecular weight of the fatty alcohols, used to make the alkyl sulphate anionic surfactant or the alkyl alkoxy sulphate anionic surfactant, can also be determined by methods known in the art. Such methods include capillary gas chromatography with flame ionization detection on medium polar capillary column, using hexane as the solvent. The chain length distribution is based on the starting alcohol and alkoxylated alcohol. As such, the alkyl sulphate anionic surfactant should be hydrolyzed back to the corresponding alkyl alcohol and alkyl alkoxylated alcohol before analysis, for instance using hydrochloric acid.

The alkyl alkoxy sulphate surfactant can have an average degree of alkoxylation of less than 3.5, preferably from 0.3 to 2.0, more preferably from 0.5 to 0.9, in order to improve low temperature physical stability and improve suds mileage of the compositions of the present invention. When alkoxylated, ethoxylation is preferred.

The average degree of alkoxylation is the mol average degree of alkoxylation (i.e., mol average alkoxylation degree) of all the alkyl sulphate anionic surfactant. Hence, when calculating the mol average alkoxylation degree, the mols of non-alkoxylated sulphate anionic surfactant are included:

$$\text{Mol average alkoxylation degree}=(x1*\text{alkoxylation degree of surfactant } 1+x2*\text{alkoxylation degree of surfactant } 2+\ldots)/(x1+x2+\ldots)$$

where x1, x2, . . . are the number of moles of each alkyl (or alkoxy) sulphate anionic surfactant of the mixture and alkoxylation degree is the number of alkoxy groups in each alkyl sulphate anionic surfactant.

Preferred alkyl alkoxy sulphates are alkyl ethoxy sulphates.

The alkyl sulphate anionic surfactant and the alkyl alkoxy sulphate anionic surfactant can have a weight average degree of branching of at least 10%, preferably from 20% to 60%, more preferably from 30% to 50%. Alternatively, the alkyl sulphate anionic surfactant and the alkyl alkoxy sulphate anionic surfactant can have a weight average degree of branching of less than 10%, preferably the alkyl sulphate anionic surfactant and the alkyl alkoxy sulphate anionic surfactant are free of branching.

The alkyl sulphate anionic surfactant and the alkyl alkoxy sulphate anionic surfactant can comprise at least 5%, preferably at least 10%, most preferably at least 25%, by weight of the surfactant, of branching on the C2 position (as measured counting carbon atoms from the sulphate group for non-alkoxylated alkyl sulphate anionic surfactants and counting from the alkoxy-group furthest from the sulphate group for alkoxylated alkyl sulphate anionic surfactants). More preferably, greater than 75%, even more preferably greater than 90%, by weight of the total branched alkyl content consists of C1-C5 alkyl moiety, preferably C1-C2 alkyl moiety. It has been found that formulating the inventive compositions using alkyl sulphate surfactants or alkyl alkoxy sulphate surfactants having the aforementioned degree of branching results in improved low temperature stability. Such compositions require less solvent in order to achieve good physical stability at low temperatures. As such, the compositions can comprise lower levels of organic solvent, such as less than 5.0% by weight of the liquid cleaning composition of organic solvent, while still having improved low temperature stability. Higher surfactant branching also provides faster initial suds generation, but typically less suds mileage. The weight average branching, described herein, has been found to provide improved low temperature stability, initial foam generation and suds longevity.

The weight average degree of branching for an anionic surfactant mixture can be calculated using the following formula:

$$\text{Weight average degree of branching (\%)}=[(x1*\text{wt \% branched alcohol 1 in alcohol 1}+x2*\text{wt \% branched alcohol 2 in alcohol 2}+\ldots)/(x1+x2+\ldots)]*100$$

where x1, x2, . . . are the weight in grams of each alcohol in the total alcohol mixture of the alcohols which were used as starting material before (alkoxylation and) sulphation to produce the alkyl (alkoxy) sulphate anionic surfactant. In the weight average degree of branching calculation, the weight of the alkyl alcohol used to form the alkyl sulphate anionic surfactant which is not branched is included.

The weight average degree of branching and the distribution of branching can typically be obtained from the technical data sheet for the surfactant or constituent alkyl alcohol. Alternatively, the branching can also be determined through analytical methods known in the art, including capillary gas chromatography with flame ionization detection on medium polar capillary column, using hexane as the solvent. The weight average degree of branching and the distribution of branching is based on the starting alcohol used to produce the alkyl sulphate anionic surfactant.

Suitable counterions include alkali metal cation earth alkali metal cation, alkanolammonium or ammonium or substituted ammonium, but preferably sodium. Suitable examples of commercially available alkyl sulphate anionic surfactants include, those derived from alcohols sold under the Neodol® brand-name by Shell, or the Lial®, Isalchem®, and Safol® brand-names by Sasol, or some of the natural alcohols produced by The Procter & Gamble Chemicals company. The alcohols can be blended in order to achieve the desired mol fraction of C12 and C13 chains and the desired C13/C12 ratio, based on the relative fractions of C13 and C12 within the starting alcohols, as obtained from the technical data sheets from the suppliers or from analysis using methods known in the art.

The performance can be affected by the width of the alkoxylation distribution of the alkoxylated alkyl sulphate anionic surfactant, including grease cleaning, sudsing, low temperature stability and viscosity of the finished product. The alkoxylation distribution, including its broadness can be varied through the selection of catalyst and process conditions when making the alkoxylated alkyl sulphate anionic surfactant.

If ethoxylated alkyl sulphate is present, without wishing to be bound by theory, through tight control of processing conditions and feedstock material compositions, both during alkoxylation especially ethoxylation and sulphation steps, the amount of 1,4-dioxane by-product within alkoxylated especially ethoxylated alkyl sulphates can be reduced. Based on recent advances in technology, a further reduction of 1,4-dioxane by-product can be achieved by subsequent stripping, distillation, evaporation, centrifugation, microwave irradiation, molecular sieving or catalytic or enzymatic degradation steps. Processes to control 1,4-dioxane content within alkoxylated/ethoxylated alkyl sulphates have been described extensively in the art. Alternatively 1,4-dioxane level control within detergent formulations has also been described in the art through addition of 1,4-dioxane inhibitors to 1,4-dioxane comprising formulations, such as 5,6-dihydro-3-(4-morpholinyl)-1-[4-(2-oxo-1-piperidinyl)-phenyl]-2-(1-H)-pyridone, 3-α-hydroxy-7-oxo stereoisomer-mixtures of cholinic acid, 3-(N-methyl amino)-L-alanine, and mixtures thereof.

Anionic alkyl sulphonate or sulphonic acid surfactants suitable for use herein include the acid and salt forms of alkylbenzene sulphonates, alkyl ester sulphonates, primary and secondary alkane sulphonates such as paraffin sulfonates, alfa or internal olefin sulphonates, alkyl sulphonated (poly)carboxylic acids, and mixtures thereof. Suitable anionic sulphonate or sulphonic acid surfactants include: C5-C20 alkylbenzene sulphonates, more preferably C10-C16 alkylbenzene sulphonates, more preferably C11-C13 alkylbenzene sulphonates, C5-C20 alkyl ester sulphonates especially C5-C20 methyl ester sulfonates, C6-C22 primary or secondary alkane sulphonates, C5-C20 sulphonated (poly)carboxylic acids, and any mixtures thereof, but preferably C11-C13 alkylbenzene sulphonates. The aforementioned surfactants can vary widely in their 2-phenyl isomer content. Compared with sulfonation of alpha olefins, the sulfonation of internal olefins can occur at any position since the double bond is randomly positioned, which leads to the position of hydrophilic sulfonate and hydroxyl groups of IOS in the middle of the alkyl chain, resulting in a variety of twin-tailed branching structures. Alkane sulphonates include paraffin sulphonates and other secondary alkane sulfonate (such as Hostapur SAS60 from Clariant).

Alkyl sulfosuccinate and dialkyl sulfosuccinate esters are organic compounds with the formula MO3SCH(CO2R')CH2CO2R where R and R' can be H or alkyl groups, and M is a counter-ion such as sodium (Na). Alkyl sulfosuccinate and dialkyl sulfosuccinate ester surfactants can be alkoxylated or non-alkoxylated, preferably non-alkoxylated. The surfactant system may comprise further anionic surfactant. However, the composition preferably comprises less than 30%, preferably less than 15%, more preferably less than 10% by weight of the surfactant system of further anionic surfactant. Most preferably, the surfactant system comprises no further anionic surfactant, preferably no other anionic surfactant than alkyl sulphate anionic surfactant.

Co-Surfactant

In order to improve surfactant packing after dilution and hence improve suds mileage, the surfactant system can comprise a co-surfactant. The co-surfactant can be selected from the group consisting of an amphoteric surfactant, a zwitterionic surfactant and mixtures thereof.

The anionic surfactant to the co-surfactant weight ratio can be from 1:1 to 8:1, preferably from 2:1 to 5:1, more preferably from 2.5:1 to 4:1.

The composition preferably comprises from 0.1% to 20%, more preferably from 0.5% to 15% and especially from 2% to 10% by weight of the cleaning composition of the co-surfactant.

The surfactant system of the cleaning composition of the present invention preferably comprises up to 50%, preferably from 10% to 40%, more preferably from 15% to 35%, by weight of the surfactant system of a co-surfactant.

The co-surfactant is preferably an amphoteric surfactant, more preferably an amine oxide surfactant.

The amine oxide surfactant can be linear or branched, though linear are preferred. Suitable linear amine oxides are typically water-soluble and characterized by the formula R1-N(R2)(R3) O wherein R1 is a C8-18 alkyl, and the R2 and R3 moieties are selected from the group consisting of C1-3 alkyl groups, C1-3 hydroxyalkyl groups, and mixtures thereof. For instance, R2 and R3 can be selected from the group consisting of methyl, ethyl, propyl, isopropyl, 2-hydroxethyl, 2-hydroxypropyl and 3-hydroxypropyl, and mixtures thereof, though methyl is preferred for one or both of R2 and R3. The linear amine oxide surfactants, in particular, may include linear C10-C18 alkyl dimethyl amine oxides and linear C8-C12 alkoxy ethyl dihydroxy ethyl amine oxides.

Preferably, the amine oxide surfactant is selected from the group consisting of alkyl dimethyl amine oxide, alkyl amido propyl dimethyl amine oxide, and mixtures thereof. Alkyl dimethyl amine oxides are particularly preferred, such as C8-18 alkyl dimethyl amine oxides, or C10-16 alkyl dimethyl amine oxides (such as coco dimethyl amine oxide). Suitable alkyl dimethyl amine oxides include C10 alkyl dimethyl amine oxide surfactant, C10-12 alkyl dimethyl amine oxide surfactant, C12-C14 alkyl dimethyl amine oxide surfactant, or mixtures thereof. C12-C14 alkyl dimethyl amine oxide is particularly preferred.

Alternative suitable amine oxide surfactants include mid-branched amine oxide surfactants. As used herein, "mid-branched" means that the amine oxide has one alkyl moiety having n1 carbon atoms with one alkyl branch on the alkyl moiety having n2 carbon atoms. The alkyl branch is located on the a carbon from the nitrogen on the alkyl moiety. This type of branching for the amine oxide is also known in the art as an internal amine oxide. The total sum of n1 and n2 can be from 10 to 24 carbon atoms, preferably from 12 to 20, and more preferably from 10 to 16. The number of carbon atoms for the one alkyl moiety (n1) is preferably the same or similar to the number of carbon atoms as the one alkyl branch (n2) such that the one alkyl moiety and the one alkyl branch are symmetric. As used herein, "symmetric" means that $|n1-n2|$ is less than or equal to 5, preferably 4, most preferably from 0 to 4 carbon atoms in at least 50 wt %, more preferably at least 75 wt % to 100 wt % of the mid-branched amine oxides for use herein. The amine oxide further comprises two moieties, independently selected from a C1-3 alkyl, a C1-3 hydroxyalkyl group, or a polyethylene oxide group containing an average of from about 1 to about 3 ethylene oxide groups. Preferably, the two moieties are selected from a C1-3 alkyl, more preferably both are selected as C1 alkyl.

Alternatively, the amine oxide surfactant can be a mixture of amine oxides comprising a mixture of low-cut amine oxide and mid-cut amine oxide. The amine oxide of the composition of the invention can then comprises:

a) from about 10% to about 45% by weight of the amine oxide of low-cut amine oxide of formula R1R2R3AO wherein R1 and R2 are independently selected from hydrogen, C1-C4 alkyls or mixtures thereof, and R3 is selected from C10 alkyls and mixtures thereof; and
b) from 55% to 90% by weight of the amine oxide of mid-cut amine oxide of formula R4R5R6AO wherein R4 and R5 are independently selected from hydrogen, $C_1$-$C_4$ alkyls or mixtures thereof, and R6 is selected from C12-C16 alkyls or mixtures thereof In a preferred low-cut amine oxide for use herein R3 is n-decyl, with preferably both R1 and R2 being methyl. In the mid-cut amine oxide of formula R4R5R6AO, R4 and R5 are preferably both methyl.

Preferably, the amine oxide comprises less than about 5%, more preferably less than 3%, by weight of the amine oxide of an amine oxide of formula R7R8R9AO wherein R7 and R8 are selected from hydrogen, C1-C4 alkyls and mixtures thereof and wherein R9 is selected from C8 alkyls and mixtures thereof. Limiting the amount of amine oxides of formula R7R8R9AO improves both physical stability and suds mileage.

Suitable zwitterionic surfactants include betaine surfactants. Such betaine surfactants includes alkyl betaines, alkylamidobetaine, amidazoliniumbetaine, sulphobetaine (INCI Sultaines) as well as the phosphobetaine, and preferably meets formula (I):

$$R1\text{-}[CO{-}X(CH2)_n]_x{-}N^+(R2)(R3)\text{-}(CH2)_m\text{-}[CH(OH){-}CH_2]_y{-}Y{-}$$

Wherein in formula (I),

R1 is selected from the group consisting of: a saturated or unsaturated C6-22 alkyl residue, preferably C8-18 alkyl residue, more preferably a saturated C10-16 alkyl residue, most preferably a saturated C12-14 alkyl residue;
X is selected from the group consisting of: NH, NR4 wherein R4 is a C1-4 alkyl residue, O, and S,
n is an integer from 1 to 10, preferably 2 to 5, more preferably 3,
x is 0 or 1, preferably 1,
R2 and R3 are independently selected from the group consisting of: a C1-4 alkyl residue, hydroxy substituted such as a hydroxyethyl, and mixtures thereof, preferably both R2 and R3 are methyl,
m is an integer from 1 to 4, preferably 1, 2 or 3,
y is 0 or 1, and
Y is selected from the group consisting of: COO, $SO_3$, OPO(OR5)O or P(O)(OR5)O, wherein R5 is H or a C1-4 alkyl residue.

Preferred betaines are the alkyl betaines of formula (Ia), the alkyl amido propyl betaine of formula (Ib), the sulphobetaine of formula (Ic) and the amido sulphobetaine of formula (Id):

$$R1\text{-}N^+(CH_3)_2{-}CH_2COO{-} \quad (Ia)$$

$$R1\text{-}CO{-}NH{-}(CH_2)_3{-}N^+(CH_3)_2{-}CH_2COO{-} \quad (Ib)$$

$$R1\text{-}N^+(CH_3)_2{-}CH_2CH(OH)CH_2SO_3{-} \quad (Ic)$$

$$R1\text{-}CO{-}NH{-}(CH_2)_3{-}N^+(CH_3)_2{-}CH_2CH(OH)CH_2SO_3{-} \quad (Id)$$

in which R1 has the same meaning as in formula (I). Particularly preferred are the carbobetaines [i.e., where Y=COO in formula (I)] of formulae (Ia) and (Ib), more preferred are the alkylamidobetaine of formula (Ib).

Suitable betaines can be selected from the group consisting or [designated in accordance with INCI]: capryl/capramidopropyl betaine, cetyl betaine, cetyl amidopropyl betaine, cocamidoethyl betaine, cocamidopropyl betaine, cocobetaines, decyl betaine, decyl amidopropyl betaine, hydrogenated tallow betaine/amidopropyl betaine, isostearamidopropyl betaine, lauramidopropyl betaine, lauryl betaine, myristyl amidopropyl betaine, myristyl betaine, oleamidopropyl betaine, oleyl betaine, palmamidopropyl betaine, palmitamidopropyl betaine, palm-kernelamidopropyl betaine, stearamidopropyl betaine, stearyl betaine, tallowamidopropyl betaine, tallow betaine, undecylenamidopropyl betaine, undecyl betaine, and mixtures thereof. Preferred betaines are selected from the group consisting of: cocamidopropyl betaine, cocobetaines, lauramidopropyl betaine, lauryl betaine, myristyl amidopropyl betaine, myristyl betaine, and mixtures thereof. Cocamidopropyl betaine is particularly preferred.

Nonionic Surfactant

The surfactant system can further comprise a nonionic surfactant. Suitable nonionic surfactants include alkoxylated alcohol nonionic surfactants, alkyl polyglucoside nonionic surfactants, and mixtures thereof.

Alkoxylated Alcohol Nonionic Surfactant

Preferably, the surfactant system of the composition of the present invention further comprises from 1% to 25%, preferably from 1.25% to 20%, more preferably from 1.5% to 15%, most preferably from 1.5% to 5%, by weight of the surfactant system, of an alkoxylated alcohol non-ionic surfactant.

Preferably, the alkoxylated alcohol non-ionic surfactant is a linear or branched, primary or secondary alkyl alkoxylated non-ionic surfactant, preferably an alkyl ethoxylated non-ionic surfactant, preferably comprising on average from 9 to 15, preferably from 10 to 14 carbon atoms in its alkyl chain and on average from 5 to 12, preferably from 6 to 10, most preferably from 7 to 8, units of ethylene oxide per mole of alcohol.

Alkyl Polyglucoside Nonionic Surfactant

If present, the alkyl polyglucoside can be present in the surfactant system at a level of from 0.5% to 20%, preferably from 0.75% to 15%, more preferably from 1% to 10%, most preferably from 1% to 5% by weight of the surfactant composition. Alkyl polyglucoside nonionic surfactants are typically more sudsing than other nonionic surfactants such as alkyl ethoxlated alcohols.

A combination of alkylpolyglucoside and anionic surfactant especially alkyl sulfate anionic surfactant, has been found to improve polymerized grease removal, suds mileage performance, reduced viscosity variation with changes in the surfactant and/or system, and a more sustained Newtonian rheology.

The alkyl polyglucoside surfactant can be selected from C6-C18 alkyl polyglucoside surfactant. The alkyl polyglucoside surfactant can have a number average degree of polymerization of from 0.1 to 3.0, preferably from 1.0 to 2.0, more preferably from 1.2 to 1.6. The alkyl polyglucoside surfactant can comprise a blend of short chain alkyl polyglucoside surfactant having an alkyl chain comprising 10 carbon atoms or less, and mid to long chain alkyl polyglucoside surfactant having an alkyl chain comprising greater than 10 carbon atoms to 18 carbon atoms, preferably from 12 to 14 carbon atoms.

Short chain alkyl polyglucoside surfactants have a monomodal chain length distribution between C8-C10, mid to long chain alkyl polyglucoside surfactants have a monomodal chain length distribution between C10-C18, while mid chain alkyl polyglucoside surfactants have a monomodal chain length distribution between C12-C14. In contrast, C8 to C18 alkyl polyglucoside surfactants typically have a monomodal distribution of alkyl chains between C8 and C18, as with C8 to C16 and the like. As such, a combination of short chain alkyl polyglucoside surfactants with mid to long chain or mid chain alkyl polyglucoside surfactants have a broader distribution of chain lengths, or even a bimodal distribution, than non-blended C8 to C18 alkyl polyglucoside surfactants. Preferably, the weight ratio of short chain alkyl polyglucoside surfactant to long chain alkyl polyglucoside surfactant is from 1:1 to 10:1, preferably from 1.5:1 to 5:1, more preferably from 2:1 to 4:1. It has been found that a blend of such short chain alkyl polyglucoside surfactant and long chain alkyl polyglucoside surfactant results in faster dissolution of the detergent solution in water and improved initial sudsing, in combination with improved suds stability.

C8-C16 alkyl polyglucosides are commercially available from several suppliers (e.g., Simusol® surfactants from Seppic Corporation; and Glucopon® 600 CSUP, Glucopon® 650 EC, Glucopon® 600 CSUP/MB, and Glucopon® 650 EC/MB, from BASF Corporation). Glucopon® 215UP is a preferred short chain APG surfactant. Glucopon® 600CSUP is a preferred mid to long chain APG surfactant.

In preferred compositions, the surfactant system can comprise an alkyl sulfate anionic surfactant having an average degree of branching of less than 10% and alkyl polyglucoside nonionic surfactant.

Cationically Modified Inulin Compound

The liquid hand dishwashing detergent composition comprises a cationically modified inulin compound (also referred to herein as cationic inulin). The liquid hand dishwashing detergent composition according to the present disclosure may comprise about 0.01% to about 5%, or about 0.05% to about 3%, or about 0.1% to about 2%, or about 0.25% to about 1.0% by weight of the composition of cationic inulin.

Carbohydrates and polysaccharides have long been used in various detergent products. Within liquid hand dishwashing formulations, however, there continues to be a need to identify carbohydrate-based compounds having improved properties, such as providing improved rinsing performance without compromising (or even improving) rinse feel properties and/or finished product viscosity. Inulins are a group of naturally occurring polysaccharide carbohydrates that belong to a class known as D-fructans.

Inulin can be of bacterial origin, plant origin (e.g., inulin may be obtained from chicory, dahlias, and/or Jerusalem artichokes), or it may be made in vitro by enzymatic synthesis starting from sucrose. Inulin produced by bacteria tends to be more branched than inulin of plant origin and typically has a higher molecular weight (ranging from about 2,000 daltons to about 20,000,000 daltons). Inulin of plant origin is generally a polydisperse mixture of linear and slightly branched polysaccharide chains with a degree of polymerisation (DP) ranging from 2 to about 100, and it has a molecular weight generally ranging from about 600 daltons to about 20,000 daltons. At industrial scale, inulin is commonly prepared from chicory or tubers of Jerusalem artichoke, where inulin may be present at concentrations of about 10% to about 20% w/w of fresh plant material. In accordance with known techniques, inulin can be readily extracted from plants, purified, and optionally fractionated to remove impurities, such as mono- and disaccharides and undesired oligosaccharides.

Inulin comprises chain-terminating glucosyl moieties and repetitive fructosyl moieties, which are linked by P(2,1) bonds. A general structure of inulin is shown below.

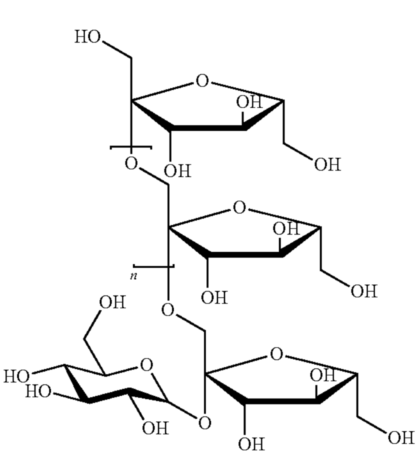

General structure of inulin

Inulin may be represented by the formula GFn or Fn, wherein G represents a glucosyl unit, F represents a fructosyl unit, and n is an integer representing the number of fructosyl units linked to each other in the carbohydrate chain. The total number of fructosyl units (for Fn, n) or fructosyl and glucosyl units (for GFn, n+1) in an inulin molecule may be referred to as the degree of polymerization (DP). Inulin may have a degree of polymerization ranging from about 2 to about 60 (inulin fractions having degrees of polymerization less than 10 may be considered short-chained fructo-oligosaccharides. Inulin has been found to improve the stability of foams and emulsions.

Inulin may be modified at one or more available hydroxyl groups with, for example, alkyl, alkoxy, carboxy, carboxyalkyl, or quaternary groups, thereby producing an anionically, nonionically, or cationically modified inulin, depending on the charge of the modifying group. Incorporating a cationically modified inulin into a liquid hand dishwashing detergent composition has been found to contribute to the easy rinsing and improved solution feel of the composition. A cationic or cationically modified inulin is a derivate of inulin comprising a cationic group. The terms “positively charged organic group”, “positively charged ionic group”, and “cationic group” are used interchangeably herein. A positively charged organic group may itself have one or more substitutions, for example, substituted with one or more hydroxyl groups, oxygen atoms (forming a ketone group), alkyl groups, and/or at least one additional positively charged group. Examples of cationic groups include substituted ammonium groups, carbocation groups, and acyl cation groups.

A substituted ammonium group may be represented by the structure shown below:

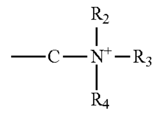

where $R_2$, $R_3$ and $R_4$ may each independently represent a hydrogen atom, an alkyl group, or a $C_6$-$C_{24}$ aryl group. The carbon atom (C) is part of the carbon chain of the positively charged organic group. The carbon atom may either be directly ether-linked to a fructose monomer or the carbon atom may be part of a chain of two or more carbon atoms that are ether-linked to a fructose monomer. The carbon atom (C) may be unsubstituted ($—CH_2—$) or substituted ($—CHR_5—$ or ($—CHR_5R_6—$), where $R_5$ and/or $R_6$ may each represent a hydroxyl group. When $R_2$, $R_3$ and/or $R_4$ represent an alkyl group, the alkyl group can be a $C_1$-$C_{30}$ alkyl group, for example a methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, icosyl, henicosyl, docosyl, tricosyl, tetracosyl, $C_{25}$, $C_{26}$, $C_{27}$, $C_{28}$, $C_{29}$, or $C_{30}$ group. The alkyl group can be a $C_1$-$C_{24}$ alkyl group, or a $C_1$-$C_{18}$ or a $C_6$-$C_{20}$ alkyl group, or a $C_{10}$-$C_{16}$ alkyl group, or a $C_1$-$C_4$ alkyl group. When a positively charged organic group comprises a substituted ammonium group which has two or more alkyl groups, each alkyl group can be the same as or different from the other. When $R_2$, $R_3$ and/or $R_4$ represent an aryl group, the aryl group can be a $C_6$-$C_{24}$ aryl group, optionally substituted with alkyl substituents. The aryl group can be a $C_{12}$-$C_{24}$ aryl group, optionally substituted with alkyl substituents, or a $C_6$-$C_{18}$ aryl group, optionally substituted with alkyl substituents. The substituted ammonium group can be a “primary ammonium group”, “secondary ammonium group”, “tertiary ammonium group”, or “quaternary ammonium” group. In a primary ammonium group, each of $R_2$, $R_3$, and $R_4$ is a hydrogen atom. In a secondary ammonium group, each of $R_2$ and $R_3$ is a hydrogen atom and $R_4$ may be a $C_1$-$C_{30}$ alkyl group or a $C_6$-$C_{24}$ aryl group. In a tertiary ammonium group, $R_2$ is a hydrogen atom and each of $R_3$ and $R_4$ may be independently selected from a $C_1$-$C_{24}$ alkyl group or a $C_6$-$C_{24}$ aryl group. In a quaternary ammonium group, each of $R_2$, $R_3$ and $R_4$ is independently selected from a $C_1$-$C_{30}$ alkyl group or a $C_6$-$C_{24}$ aryl group (and none of $R_2$, $R_3$ and $R_4$ is a hydrogen atom). Suitable quaternary ammonium groups include trialkyl ammonium groups, where each of $R_2$, $R_3$ and $R_4$ is independently selected from $C_1$-$C_{30}$ alkyl groups (the alkyl groups may be the same or different).

The cationically modified inulin may be substituted with a substituted ammonium group, preferably a substituted quaternary ammonium group, more preferably a substituted quaternary ammonium group substituted with at least one $C_1$-$C_{18}$ alkyl group, even more preferably, a quaternary ammonium group substituted with at least one $C_1$-$C_4$ alkyl group, even more preferably a quaternary ammonium group substituted with at least two $C_1$-$C_4$ alkyl groups.

The cationically modified inulin may be randomly substituted with cationic groups, meaning that the substituents or modifications on the fructose rings of the inulin compound occur in a non-repeating or random fashion, as opposed to a pattern. For example, a substitution or modification on a first fructose ring may be the same as or different from a substitution or modification on a second fructose ring in the polysaccharide chain (e.g., the substituent groups may be the same or different and/or may occur on different atoms in the fructose rings). Further, substitution or modification may occur randomly along the inulin polysaccharide chain, such that the chain comprises unsubstituted and substituted fructose rings in random order. The degree of substitution may also vary.

The term “degree of substitution” (DoS), as used herein, refers to the number of hydroxyl groups substituted in each fructose monomeric unit (fructosyl moiety) of a modified or substituted inulin compound. The average degree of substitution refers to the average number of hydroxyl groups substituted in each fructose monomeric unit (fructosyl moiety) of a modified or substituted inulin compound. For inulin compounds modified by more than one different substituent, the degree of substitution may be specified by substituent or may be the sum of the degrees of substitution of the different substituents—an overall degree of substitution. As used herein, when the degree of substitution is not specified by substituent, the overall degree of substitution of the modified inulin compound is meant. Also, because there are three hydroxyl groups in each fructosyl moiety of the inulin backbone, the degree of substitution cannot be greater than 3. A modified inulin compound may have a degree of substitution ranging from about 0.01 to about 3.0. The degree of substitution may also be described as a cationic degree of substitution (e.g., the sum of the degrees of substitution of the cationic substituents) or a net cationic degree of substitution (e.g., for inulin compounds modified by cationic substituents as well as neutral and/or anionic substituents). The degree of substitution may be selected to provide desired solubility of the modified inulin compound in a composition and/or to provide desired performance benefits to the composition comprising the modified inulin compound.

The cationic inulin (and/or the unmodified inulin backbone) may have a number average degree of polymerization (DPn) or a weight average degree of polymerization (DPw) of at least 5. The DPn or DPw may range from about 5 to about 200, or from about 10 to about 100 or from about 15 to about 50. The number average degree of polymerization is the value corresponding to the total number of saccharide units (fructosyl units or fructosyl and glucosyl units) in an inulin composition divided by the total number of inulin molecules present in the inulin composition (generally without accounting for the possible presence of impurities, such as glucose, fructose, or sucrose).

The cationically modified inulin may have a weight average molecular weight of from about 500 daltons to about 25,000 daltons, or from about 800 daltons to about 10,000 daltons, or from about 1,000 daltons to about 7,500 daltons. The weight average molecular weight of the cationic inulin may be selected based on the application and/or intended benefit.

The cationically modified inulin may be derived from an inulin backbone having a weight average molecular weight of from about 500 to about 25,000 daltons, or from about 800 to about 10,000 daltons, or from about 1,000 to about 5,000 daltons, determined prior to modification with the cationic group. The weight average molecular weight of the inulin backbone may be selected based on the application and/or intended benefit.

The cationically modified inulin may have a degree of substitution ranging from about 0.001 to about 3, preferably from about 0.01 to about 3.0, more preferably from about 0.1 to 3.0, even more preferably 0.5 to 3.0 or about 1.0 to about 3.0.

The cationically modified inulin may be characterized by a cationic charge density. Cationic charge density may be expressed as milliequivalents of charge per gram of compound (meq/mol). The cationically modified inulin compounds of the present disclosure may be characterized by a cationic charge density (or "CCD") ranging from about 0.05 to about 12 meq/g, or from about 0.1 to about 9 meq/g, o]r from about 0.5 to about 6 meq/g, or from about 1.0 to about 4 meq/g.

The cationically modified inulin may be characterized by one or more of the following characteristics: (a) a number average degree of polymerization of from about 5 to about 200; (b) a weight average degree of polymerization of from about 5 to about 200; (c) a weight average molecular weight of from about 500 to about 25,000 daltons; (d) derived from an inulin backbone having a weight average molecular weight of from about 500 to about 25,000 daltons (determined prior to cationic modification); (e) a degree of substitution of from about 0.01 to about 3.0; and/or a cationic charge density of from about 0.05 to about 12 meq/g.

Methods of determining degree of polymerization (number average (DPn) and weight average (DPw)), degree of substitution, and cationic charge density are well known.

Suitable cationally modified inulin compounds are available from the Cosun Beet company under the Quatin® tradenames.

Further Ingredients

The composition can comprise further ingredients such as those selected from: amphiphilic alkoxylated polyalkyleneimines, cyclic polyamines, triblock copolymers, hydrotropes, organic solvents, other adjunct ingredients such as those described herein, and mixtures thereof.

Amphiphilic Alkoxylated Polyalkyleneimine

The composition of the present invention may further comprise from 0.05% to 2%, preferably from 0.07% to 1% by weight of the total composition of an amphiphilic polymer. Suitable amphiphilic polymers can be selected from the group consisting of: amphiphilic alkoxylated polyalkyleneimine and mixtures thereof. The amphiphilic alkoxylated polyalkyleneimine polymer has been found to reduce gel formation on the hard surfaces to be cleaned when the liquid composition is added directly to a cleaning implement (such as a sponge) before cleaning and consequently brought in contact with heavily greased surfaces, especially when the cleaning implement comprises a low amount to nil water such as when light pre-wetted sponges are used.

A preferred amphiphilic alkoxylated polyethyleneimine polymer has the general structure of formula (I):

(I)

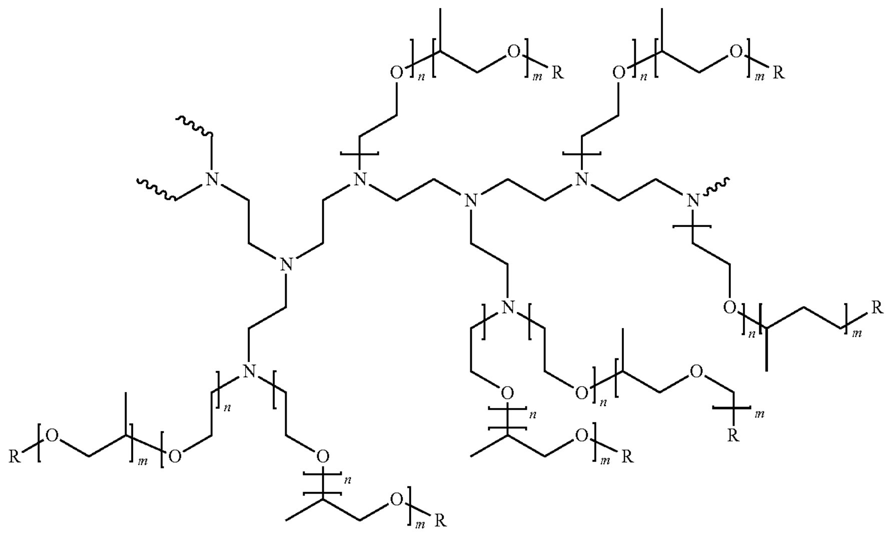

where the polyethyleneimine backbone has a weight average molecular weight of 600, n of formula (I) has an average of 10, m of formula (I) has an average of 7 and R of formula (I) is selected from hydrogen, a $C_1$-$C_4$ alkyl and mixtures thereof, preferably hydrogen. The degree of permanent quaternization of formula (I) may be from 0% to 22% of the polyethyleneimine backbone nitrogen atoms. The molecular weight of this amphiphilic alkoxylated polyethyleneimine polymer preferably is between 10,000 and 15,000 Da.

More preferably, the amphiphilic alkoxylated polyethyleneimine polymer has the general structure of formula (I) but wherein the polyethyleneimine backbone has a weight average molecular weight of 600 Da, n of Formula (I) has an average of 24, m of Formula (I) has an average of 16 and R of Formula (I) is selected from hydrogen, a $C_1$-$C_4$ alkyl and mixtures thereof, preferably hydrogen. The degree of permanent quaternization of Formula (I) may be from 0% to 22% of the polyethyleneimine backbone nitrogen atoms and is preferably 0%. The molecular weight of this amphiphilic alkoxylated polyethyleneimine polymer preferably is between 25,000 and 30,000, most preferably 28,000 Da.

The amphiphilic alkoxylated polyethyleneimine polymers can be made by the methods described in more detail in PCT Publication No. WO 2007/135645.

Alternatively, the compositions can be free of amphiphilic polymers.

Cyclic Polyamine

The composition can comprise a cyclic polyamine having amine functionalities that helps cleaning. The composition of the invention preferably comprises from 0.1% to 3%, more preferably from 0.2% to 2%, and especially from 0.5% to 1%, by weight of the total composition, of the cyclic polyamine.

The cyclic polyamine has at least two primary amine functionalities. The primary amines can be in any position in the cyclic amine but it has been found that in terms of grease cleaning, better performance is obtained when the primary amines are in positions 1,3. It has also been found that cyclic amines in which one of the substituents is —$CH_3$ and the rest are H provided for improved grease cleaning performance.

Accordingly, the most preferred cyclic polyamine for use with the cleaning composition of the present invention are cyclic polyamine selected from the group consisting of 2-methylcyclohexane-1,3-diamine, 4-methylcyclohexane-1,3-diamine and mixtures thereof. These specific cyclic polyamines work to improve suds and grease cleaning profile through-out the dishwashing process when formulated together with the surfactant system of the composition of the present invention.

Suitable cyclic polyamines can be supplied by BASF, under the Baxxodur tradename, with Baxxodur ECX-210 being particularly preferred.

A combination of the cyclic polyamine and magnesium sulphate is particularly preferred. As such, the composition can further comprise magnesium sulphate at a level of from 0.001% to 2.0%, preferably from 0.005% to 1.0%, more preferably from 0.01% to 0.5% by weight of the composition.

Triblock Copolymer

The composition of the invention can comprise a triblock copolymer. The triblock co-polymers can be present at a level of from 1% to 20%, preferably from 3% to 15%, more preferably from 5% to 12%, by weight of the total composition. Suitable triblock copolymers include alkylene oxide triblock co-polymers, defined as a triblock co-polymer having alkylene oxide moieties according to Formula (I): $(EO)_x(PO)_y(EO)_x$, wherein EO represents ethylene oxide, and each x represents the number of EO units within the EO block. Each x can independently be on average of from 5 to 50, preferably from 10 to 40, more preferably from 10 to 30. Preferably x is the same for both EO blocks, wherein the "same" means that the x between the two EO blocks varies within a maximum 2 units, preferably within a maximum of 1 unit, more preferably both x's are the same number of units. PO represents propylene oxide, and y represents the number of PO units in the PO block. Each y can on average be from between 28 to 60, preferably from 30 to 55, more preferably from 30 to 48.

Preferably the triblock co-polymer has a ratio of y to each x of from 3:1 to 2:1. The triblock co-polymer preferably has a ratio of y to the average x of 2 EO blocks of from 3:1 to 2:1. Preferably the triblock co-polymer has an average weight percentage of total E-O of between 30% and 50% by weight of the tri-block co-polymer. Preferably the triblock co-polymer has an average weight percentage of total PO of between 50% and 70% by weight of the triblock co-polymer. It is understood that the average total weight % of EO and PO for the triblock co-polymer adds up to 100%. The triblock co-polymer can have an average molecular weight of between 2060 and 7880, preferably between 2620 and 6710, more preferably between 2620 and 5430, most preferably between 2800 and 4700. Average molecular weight is determined using a 1H NMR spectroscopy (see Thermo scientific application note No. AN52907).

Triblock co-polymers have the basic structure ABA, wherein A and B are different homopolymeric and/or monomeric units. In this case A is ethylene oxide (EO) and B is propylene oxide (PO). Those skilled in the art will recognize the phrase "block copolymers" is synonymous with this definition of "block polymers".

Triblock co-polymers according to Formula (I) with the specific EO/PO/EO arrangement and respective homopolymeric lengths have been found to enhances suds mileage performance of the liquid hand dishwashing detergent composition in the presence of greasy soils and/or suds consistency throughout dilution in the wash process.

Suitable EO-PO-EO triblock co-polymers are commercially available from BASF such as Pluronic® PE series, and from the Dow Chemical Company such as Tergitol™ L series. Particularly preferred triblock co-polymer from BASF are sold under the tradenames Pluronic® PE6400 (MW ca 2900, ca 40 wt % EO) and Pluronic® PE 9400 (MW ca 4600, 40 wt % EO). Particularly preferred triblock co-polymer from the Dow Chemical Company is sold under the tradename Tergitol™ L64 (MW ca 2700, ca 40 wt % EO).

Preferred triblock co-polymers are readily biodegradable under aerobic conditions.

Salt, Hydrotrope, Organic Solvent

The composition of the present invention may further comprise at least one active selected from the group consisting of: i) a salt, ii) a hydrotrope, iii) an organic solvent, and mixtures thereof Salt The composition of the present invention may comprise from about 0.05% to about 2%, preferably from about 0.1% to about 1.5%, or more preferably from about 0.5% to about 1%, by weight of the total composition of a salt, preferably a monovalent or divalent inorganic salt, or a mixture thereof, more preferably selected from: sodium chloride, sodium sulphate, and mixtures thereof. Sodium chloride is most preferred.

Hydrotrope

The composition of the present invention may comprise from about 0.10% to about 10%, or preferably from about 0.5% to about 10%, or more preferably from about 1% to about 10% by weight of the total composition of a hydrotrope or a mixture thereof, preferably sodium cumene sulphonate.

Organic Solvent

The composition can comprise from about 0.10% to about 10%, or preferably from about 0.5% to about 10%, or more preferably from about T % to about 10% by weight of the total composition of an organic solvent. Suitable organic solvents include organic solvents selected from the group consisting of alcohols, glycols, glycol ethers, and mixtures thereof, preferably alcohols, glycols, and mixtures thereof. Ethanol is the preferred alcohol. Polyalkyleneglycols, especially polypropyleneglycol, is the preferred glycol, with polypropyleneglycols having a weight average molecular weight of from 750 Da to 1,400 Da being particularly preferred.

Adjunct Ingredients

The cleaning composition may optionally comprise a number of other adjunct ingredients such as builders (preferably citrate), chelants, conditioning polymers, other cleaning polymers, surface modifying polymers, structurants, emollients, humectants, skin rejuvenating actives, enzymes, carboxylic acids, scrubbing particles, perfumes, malodor control agents, pigments, dyes, opacifiers, pearlescent particles, inorganic cations such as alkaline earth metals such as Ca/Mg-ions, antibacterial agents, preservatives, viscosity adjusters (e.g., salt such as NaCl, and other mono-, di- and trivalent salts) and pH adjusters and buffering means (e.g. carboxylic acids such as citric acid, HCl, NaOH, KOH, alkanolamines, carbonates such as sodium carbonates, bicarbonates, sesquicarbonates, and alike).

Packaged Product

The hand dishwashing detergent composition can be packaged in a container, typically plastic containers. Suitable containers comprise an orifice. Suitable containers include traditional upright dosing containers, where the orifice is at the top of the container, and inverted/bottom dosing containers, where the orifice is at the bottom of the container. For inverted/bottom dosing containers, the orifice may be capped and/or the orifice may comprise a slit valve, such as described in U.S. Pat. No. 10,611,531. Typically, the container comprises a cap, with the orifice typically comprised on the cap. The cap can comprise a spout, with the orifice at the exit of the spout. The spout can have a length of from 0.5 mm to 10 mm.

The orifice can have an open cross-sectional surface area at the exit of from 3 mm2 to 20 mm2, preferably from 3.8 mm2 to 12 mm2, more preferably from 5 mm2 to 10 mm2, wherein the container further comprises the composition according to the invention. The cross-sectional surface area is measured perpendicular to the liquid exit from the container (that is, perpendicular to the liquid flow during dispensing).

The container can typically comprise from 200 ml to 5,000 ml, preferably from 350 ml to 2000 ml, more preferably from 400 ml to 1,000 ml of the liquid hand dishwashing detergent composition.

Method of Washing

The invention is further directed to a method of manually washing dishware with the composition of the present invention. The method comprises the steps of delivering a composition of the present invention to a volume of water to form a wash solution and immersing the dishware in the solution. The dishware is be cleaned with the composition in the presence of water.

The dishware can be rinsed. By "rinsing", it is meant herein contacting the dishware cleaned with the process according to the present invention with substantial quantities of appropriate solvent, typically water. By "substantial quantities", it is meant usually about 1 to about 20 L, or under running water.

The composition herein can be applied in its diluted form. Soiled dishware is contacted with an effective amount, typically from about 0.5 mL to about 20 mL (per about 25 dishes being treated), preferably from about 3 mL to about 10 mL, of the cleaning composition, preferably in liquid form, of the present invention diluted in water. The actual amount of cleaning composition used will be based on the judgment of the user and will typically depend upon factors such as the particular product formulation of the cleaning composition, including the concentration of active ingredients in the cleaning composition, the number of soiled dishes to be cleaned, the degree of soiling on the dishes, and the like. Generally, from about 0.01 mL to about 150 mL, preferably from about 3 mL to about 40 mL of a cleaning composition of the invention is combined with from about 2,000 mL to about 20,000 mL, more typically from about 5,000 mL to about 15,000 mL of water in a sink. The soiled dishware is immersed in the sink containing the diluted cleaning compositions then obtained, before contacting the soiled surface of the dishware with a cloth, sponge, or similar cleaning implement. The cloth, sponge, or similar cleaning implement may be immersed in the cleaning composition and water mixture prior to being contacted with the dishware, and is typically contacted with the dishware for a period of time ranged from about 1 to about 10 seconds, although the actual time will vary with each application and user. The contacting of cloth, sponge, or similar cleaning implement to the dishware is accompanied by a concurrent scrubbing of the dishware.

Alternatively, the composition herein can be applied in its neat form to the dish to be treated. By "in its neat form", it is meant herein that said composition is applied directly onto the surface to be treated, or onto a cleaning device or implement such as a brush, a sponge, a nonwoven material, or a woven material, without undergoing any significant dilution by the user (immediately) prior to application. "In its neat form", also includes slight dilutions, for instance, arising from the presence of water on the cleaning device, or the addition of water by the consumer to remove the remaining quantities of the composition from a bottle. Therefore, the composition in its neat form includes mixtures having the composition and water at ratios ranging from 50:50 to 100:0, preferably 70:30 to 100:0, more preferably 80:20 to 100:0, even more preferably 90:10 to 100:0 depending on the user habits and the cleaning task.

Test Methods

A) Foam Rinsing Test Method:

Conical centrifuge tubes (50 ml, supplied by Corning under the Falcon™ tradename) are mounted together in a placeholder rack to allow parallel measurements with matching exposure conditions.

1. 10 g of test solution for each leg, consisting of a 1.0 wt % solution of the respective detergent composition in water of targeted water hardness at room temperature (20° C.), is added into each tube.
2. All the tubes are simultaneously shaken 10 times in a vertical up and down direction at a speed of 2 strokes per second (1 stroke reflects a 25 cm vertical up and down motion), such that the liquid makes contact once with the screw cap during each stroke movement step, in order to generate the suds.

3. Within 30 s after shaking, the initial suds volume (in ml) is determined.
4. The liquid is then decanted such that only the suds remain.
5. The centrifuge tubes containing the suds are then gently filled via a calibrated bottle dispenser (such as a Dispensette® bottle dispenser from Sigma Aldrich) via the tube wall with 10 mL water rinse solution of targeted water hardness at 20° C.
6. All the tubes are again simultaneously shaken 2 times.
7. Within 30 s after shaking, the suds volume is re-measured and the liquid is decanted again. In this way, steps 5 through 7 represent a rinse cycle.
8. The rinse cycle is repeated until the suds volume reaches 0 ml.
9. The following data are obtained by Boltzmann fitting and the average of 3 replicates is reported: Starting suds volume–v50 (amount of cycles to reach half of the starting suds volume). A Boltzmann fitting of the curve is done by nonlinear regression: Start/(1+exp (–(v50-cycle)/slope)).

B) Solution Feel Method:

0.5% by weight of each respective detergent compositions is prepared in 2dH water at room temperature (20° C.) ° C. A reference detergent composition that does not contain a cationically modified inulin compound solution and a detergent composition that contains 0.5% by weight of the detergent composition of a cationically modified inulin compound solution is prepared for paired comparison. A second reference detergent composition containing 0.5% by weight of the detergent composition of a cationically modified hydroxyethylcellulose is also prepared. This assessment is done by a sensory expert panel. Panelists are selected based of their sensory acuity, ability to describe products, and for their personal interest in sensory. Panelists are trained to do sensory evaluations that range from descriptive analysis to distinguishing different compositions. The assessment takes place in a controlled temperature and humidity lab: 21° C. (1.7° C.) and 45% RH (+5% RH). Each panelist first cleans his/her hands with soft water (2dH) at room temperature (20° C.) and then dries his/her hands. Each panelist then introduces his/her hands into the test solution (left hand in test solution 1, right hand in test solution 2) and rubs his/her fingers slowly in the test solution for at least 10 seconds. The panelist determines which of the two samples is more slippery. The panelist then cleans his/her hands again with soft water (2dH) at room temperature (20° C.) ° C. and dries his/her hands, before evaluating the next pair of products. This assessment is done by 8-10 panelists and their scores are summed up (the lower the score, the better).

C) Viscosity Test Method:

The viscosity is measured using a controlled stress rheometer (such as an HAAKE MARS from Thermo Scientific, or equivalent), using a 60 mm 1° cone and a gap size of 52 microns at 20° C. After temperature equilibration for 2 minutes, the sample is sheared at a shear rate of 10 $s^{-1}$ for 30 seconds. The reported viscosity of the liquid hand dishwashing detergent compositions is defined as the average shear stress between 15 seconds and 30 seconds shearing divided by the applied shear rate of 10 $s^{-1}$ at 20° C.

EXAMPLES

The examples provided below are intended to be illustrative in nature and are not intended to be limiting.

Example 1. Foam Rinsing Test

The following comparative test demonstrates the improvement in rinsing that is achieved by formulating a detergent composition with a cationically modified inulin compound, as described in the present disclosure.

Detergent compositions 1-4 and A-H, described in Tables 1 and 2 below, are prepared by mixing the listed materials in a batch type making process. The detergent compositions of Table 1 contain an alkyl ethoxy sulfate anionic surfactant and an amine oxide surfactant. The detergent compositions of Table 2 contain alkyl sulfate anionic surfactant and a betaine surfactant.

Detergent compositions 1-4 comprise 0.5% of a cationically modified inulin compound, in accordance with the present disclosure. Comparative detergent compositions A and E do not comprise an inulin compound. Comparative detergent compositions B-D and F—H comprise 0.5% of an unmodified inulin compound (B, F) or an anionically modified inulin compound (C, D, G, H).

Tables 1 and 2 show the initial suds volume, as well as the resultant v50 suds volume, using the test methods described above.

TABLE 1

| | A wt % | B wt % | C wt % | D wt % | 1 wt % | 2 wt % |
|---|---|---|---|---|---|---|
| C12-13AE0.7S (42.03% branching) | 9.5 | 9.5 | 9.5 | 9.5 | 9.5 | 9.5 |
| C12-14 dimethyl amine oxide | 4.7 | 4.7 | 4.7 | 4.7 | 4.7 | 4.7 |
| C9-11 EO8 nonionic surfactant | 7.1 | 7.1 | 7.1 | 7.1 | 7.1 | 7.1 |
| Glucopon ® 600 CSUP APG surfactant | 7.1 | 7.1 | 7.1 | 7.1 | 7.1 | 7.1 |
| Sodium citrate | 1 | 1 | 1 | 1 | 1 | 1 |
| Sodium cumene sulphonate | 2.3 | 2.3 | 2.3 | 2.3 | 2.3 | 2.3 |
| Methylcyclohexane-1,3-diamine[1] | 0.2 | 0.2 | 0.2 | 0.2 | 0.2 | 0.2 |
| MgCl2 | 0.2 | 0.2 | 0.2 | 0.2 | 0.2 | 0.2 |
| 1,2-PPG (MW2000) | 0.4 | 0.4 | 0.4 | 0.4 | 0.4 | 0.4 |
| Ethanol | 3.1 | 3.1 | 3.1 | 3.1 | 3.1 | 3.1 |
| Tergitol ™ L64E (EO13-PO30-EO13)[2] | 0.5 | 0.5 | 0.5 | 0.5 | 0.5 | 0.5 |
| CPB Inulin[3] | 0 | 0.5 | 0 | 0 | 0 | 0 |
| Carboxyline ® 15-40D[4] | 0 | 0 | 0.5 | 0 | 0 | 0 |
| Carboxyline ® 25-40D[5] | 0 | 0 | 0 | 0.5 | 0 | 0 |
| Cationically modified inulin (Quatin ® 350)[6] | 0 | 0 | 0 | 0 | 0.5 | 0 |
| Cationically modified inulin (Quatin ® 680)[7] | 0 | 0 | 0 | 0 | 0 | 0.5 |

TABLE 1-continued

| | A wt % | B wt % | C wt % | D wt % | 1 wt % | 2 wt % |
|---|---|---|---|---|---|---|
| Minors (e.g., dye, perfume, preservative) | 0.5-1.2 | 0.5-1.2 | 0.5-1.2 | 0.5-1.2 | 0.5-1.2 | 0.5-1.2 |
| pH (as 10% aqueous solution) | 7.5 | 7.5 | 7.5 | 7.5 | 7.5 | 7.5 |
| 1% product concentration −2 dH water hardness conditions −20° C. | | | | | | |
| Initial suds height (ml) | 27.5 | 30.0 | 28.4 | 29.1 | 27.0 | 23.4 |
| V50 | 3.47 | 3.21 | 3.42 | 3.23 | 2.96 | 2.52 |

[1]Cyclic diamine mixture of 4-methylcyclohexane-1,3-diamine and 2-methylcyclohexane-1,3-diamine, supplied under the tradename Baxxodur ® EC 210 supplied by BASF.
[2]EO-PO-EO triblock copolymer, supplied by Dow company.
[3]Unmodified inulin, supplied by the Cosun Beet Company.
[4]Carboxymethylinulin (1.5% degree of substitution), supplied by the Cosun Beet Company.
[5]Carboxymethylinulin (2.5% degree of substitution), supplied by the Cosun Beet Company.
[6]Cationically modified inulin (MW inulin backbone = 3000 g/mol, cationic charge density = 1.5 meq/g), supplied by the Cosun Beet Company.
[7]Cationically modified inulin (MW inulin backbone = 4000 g/mol, cationic charge density = 2.92 meq/g), supplied by the Cosun Beet Company.

TABLE 2

| | E wt % | F wt % | G wt % | H wt % | 3 wt % | 4 wt % |
|---|---|---|---|---|---|---|
| C12-13 alkyl sulphate (30.4% branching) | 19.8 | 19.8 | 19.8 | 19.8 | 19.8 | 19.8 |
| Cocoamido-propylbetaine | 6.6 | 6.6 | 6.6 | 6.6 | 6.6 | 6.6 |
| C9-11 EO8 nonionic surfactant | 2 | 2 | 2 | 2 | 2 | 2 |
| NaCl | 0.7 | 0.7 | 0.7 | 0.7 | 0.7 | 0.7 |
| Ethanol | 3.1 | 3.1 | 3.1 | 3.1 | 3.1 | 3.1 |
| 1,2-PPG (MW2000) | 0.9 | 0.9 | 0.9 | 0.9 | 0.9 | 0.9 |
| CPB Inulin | 0 | 0.5 | 0 | 0 | 0 | 0 |
| Carboxyline ® 15-40D | 0) | 0 | 0.5 | 0 | 0 | 0 |
| Carboxyline ® 25-40D | 0 | 0 | 0 | 0.5 | 0 | 0 |
| Cationically modified inulin (Quatin ® 350) | 0 | 0 | 0 | 0 | 0.5 | 0 |
| Cationically modified inulin (Quatin ® 680) | 0 | 0 | 0 | 0 | 0 | 0.5 |
| Minors (e.g., dye, perfume, preservative) | 0.5-1.2 | 0.5-1.2 | 0.5-1.2 | 0.5-1.2 | 0.5-1.2 | 0.5-1.2 |
| pH (as 10% aqueous solution) | 9.0 | 9.0 | 9.0 | 9.0 | 9.0 | 9.0 |
| 1% product concentration −2 dH water hardness conditions −20° C. | | | | | | |
| Initial suds height (ml) | 30.4 | 28.2 | 28.3 | 29.1 | 29.7 | 28.2 |
| V50 | 2.91 | 3.03 | 3.09 | 3.08 | 2.79 | 2.55 |

As can be seen by comparing the suds rinse data for Examples 1-4 versus comparative Examples A-H, the incorporation of various cationically modified inulin compound provides an improved rinsability profile, in various detergent formulations. Also, while improved rinsability is observed for the formulations containing cationically modified inulin compounds, it is not observed for formulations containing unmodified (B, F) or anionically modified inulin compounds (C, D, G, H).

Example 2. Solution Feel Test

The following comparative test demonstrates the impact on solution feel that is achieved by formulating a detergent composition with a cationically modified inulin compound, in accordance with the present disclosure, as compared to formulating a detergent composition with a known cationically modified cellulose ether compound, as well as a detergent composition that lacks a cationically modified compound.

Detergent compositions 5, I, and J, described in Table 3 below, are prepared by mixing the listed materials in a batch type making process. Detergent composition 5 comprises 0.5% of a cationically modified inulin compound, in accordance with the present disclosure. Comparative detergent composition I does not comprise a cationically modified inulin compound or a cationically modified cellulose ether compound, while comparative composition J comprises a cationically modified cellulose ether compound. Table 3 also includes solution feel data, measured using the method described above.

TABLE 3

| | I wt % | 5 wt % | J wt % |
|---|---|---|---|
| C12-13AE0.7S (42.03% branching) | 9.5 | 9.5 | 9.5 |
| C12-14 dimethyl amine oxide | 4.7 | 4.7 | 4.7 |
| C9-11 EO8 nonionic surfactant | 7.1 | 7.1 | 7.1 |
| Glucopon ® 600 CSUP APG surfactant | 7.1 | 7.1 | 7.1 |
| Sodium citrate | 1 | 1 | 1 |
| Sodium cumene sulphonate | 2.3 | 2.3 | 2.3 |
| Methylcyclohexane-1,3-diamine | 0.2 | 0.2 | 0.2 |
| MgCl2 | 0.2 | 0.2 | 0.2 |
| 1,2-PPG (MW2000) | 0.4 | 0.4 | 0.4 |
| Ethanol | 3.1 | 3.1 | 3.1 |
| Tergitol ™ L64E (EO13-PO30-EO13) | 0.5 | 0.5 | 0.5 |
| Cationically modified inulin (Quatin ® 680) | 0 | 0.5 | 0 |
| UCARE ™ JR-30M[8] | 0 | 0 | 0.5 |
| Minors (e.g., dye, perfume, preservative) | 0.5-1.2 | 0.5-1.2 | 0.5-1.2 |
| pH (as 10% aqueous solution) | 7.5 | 7.5 | 7.5 |
| Slippery feel grading | 6 | 2 | — |
| Slippery feel grading | 1 | — | 7 |
| Slippery feel grading | — | 0 | 8 |

[8]Cationically modified cellulose ether compound, % N 1.5-2.2, supplied by Dow company.

As can be seen from comparing the solution feel data for Example 2 versus comparative Examples I and J, the incorporation of a cationically modified inulin compound provides an improved solution feel, while the incorporation of a known cationically modified cellulose ether compound provides an inferior solution feel.

Example 3. Viscosity

The following comparative test demonstrates the effect on finished product viscosity of 15 formulating a detergent composition with a cationically modified inulin compound, as described in the present disclosure, as compared to formulating a detergent composition with a known cationically modified cellulose ether compound.

Detergent compositions A, J-N, 1, and 2 in Table 4 are prepared by mixing the listed materials in a batch type making process. Detergent composition A does not comprise an inulin compound or a cationically modified cellulose ether compound. Detergent compositions J-N comprise various known cationically modified cellulose ether compounds. Detergent compositions 1 and 2 comprise 0.5% o of a cationically modified inulin compound, in accordance with the present disclosure. Table 4 also shows the finished product viscosities of the respective detergent formulations, measured using the method described above.

TABLE 4

| | A wt % | J wt % | K wt % | L wt % | M wt % | N wt % | 1 wt % | 2 wt % |
|---|---|---|---|---|---|---|---|---|
| C12-13AE0.7S (42.03% branching) | 9.5 | 9.5 | 9.5 | 9.5 | 9.5 | 9.5 | 9.5 | 9.5 |
| C12-14 dimethyl amine oxide | 4.7 | 4.7 | 4.7 | 4.7 | 4.7 | 4.7 | 4.7 | 4.7 |
| C9-11 EO8 nonionic surfactant | 7.1 | 7.1 | 7.1 | 7.1 | 7.1 | 7.1 | 7.1 | 7.1 |
| Glucopon ® 600 CSUP APG surfactant | 7.1 | 7.1 | 7.1 | 7.1 | 7.1 | 7.1 | 7.1 | 7.1 |
| Sodium citrate | 1.0 | 1.0 | 1.0 | 1.0 | 1.0 | 1.0 | 1.0 | 1.0 |
| Sodium cumene sulphonate | 2.3 | 2.3 | 2.3 | 2.3 | 2.3 | 2.3 | 2.3 | 2.3 |
| Methylcyclohexane-1,3-diamine | 0.2 | 0.2 | 0.2 | 0.2 | 0.2 | 0.2 | 0.2 | 0.2 |
| MgCl2 | 0.2 | 0.2 | 0.2 | 0.2 | 0.2 | 0.2 | 0.2 | 0.2 |
| 1,2-PPG (MW2000) | 0.4 | 0.4 | 0.4 | 0.4 | 0.4 | 0.4 | 0.4 | 0.4 |
| Ethanol | 3.1 | 3.1 | 3.1 | 3.1 | 3.1 | 3.1 | 3.1 | 3.1 |
| Tergitol ™ L64E (EO13-PO30-EO13) | 0.5 | 0.5 | 0.5 | 0.5 | 0.5 | 0.5 | 0.5 | 0.5 |
| SupraCare ™ 150M[9] | 0 | 0 | 0.5 | 0 | 0 | 0 | 0 | 0 |
| Celquat ® SC230M[10] | 0 | 0 | 0 | 0.5 | 0 | 0 | 0 | 0 |
| UCARE ™ LR-30M[11] | 0 | 0 | 0 | 0 | 0.5 | 0 | 0 | 0 |
| SoftCat ™ PM SL30[12] | 0 | 0 | 0 | 0 | 0 | 0.5 | 0 | 0 |
| UCARE ™ JR-30M | 0 | 0.5 | 0 | 0 | 0 | 0 | 0 | 0 |
| Cationically modified inulin (Quatin ® 350) | 0 | 0 | 0 | 0 | 0 | 0 | 0.5 | 0 |
| Cationically modified inulin (Quatin ® 680) | 0 | 0 | 0 | 0 | 0 | 0 | 0 | 0.5 |
| Minors (e.g., dye, perfume, preservative) | 0.5-1.2 | 0.5-1.2 | 0.5-1.2 | 0.5-1.2 | 0.5-1.2 | 0.5-1.2 | 0.5-1.2 | 0.5-1.2 |
| pH (as 10% aqueous solution) | 7.5 | 7.5 | 7.5 | 7.5 | 7.5 | 7.5 | 7.5 | 7.5 |
| Finished product viscosity (mPa · s) | 101 | 1363 | 224 | 1578 | 1227 | 2034 | 123 | 114 |

[9]Cationically modified cellulose ether compound supplied by Dow company.
[10]Cationically modified cellulose ether compound, supplied by Nouryon.
[11]Cationically modified cellulose ether compound, supplied by Dow company.
[12]Cationically modified cellulose ether compound, supplied by Dow company.

As can be seen by comparing the finished product viscosities of Examples 1-2 versus comparative Examples A and J-N, the incorporation of various cationically modified inulin compounds barely affects finished product viscosity, while the incorporation of a known cationically modified cellulose ether compound significantly increases finished product viscosity.

In summary, the incorporation of a cationically modified inulin compound, as described in the present disclosure, results in improved foam rinsing and an improved solution feel profile, with minimal impact on the finished product viscosity. In contrast, the incorporation of a known cationically modified cellulose ether compound results in an inferior solution feel profile and significantly affects the finished product viscosity.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as “40 mm” is intended to mean “about 40 mm.”

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A liquid hand dishwashing detergent composition comprising:

A) from 5.0% to 50% by weight of the liquid hand dishwashing detergent composition of a surfactant system, wherein the surfactant system comprises:

i. an anionic surfactant selected from the group consisting of an alkyl sulphate, an alkyl alkoxy sulphate, an alkyl sulphonate, an alkyl sulphosuccinate, a dialkyl sulphosuccinate ester, and mixtures thereof; and ii. a co-surfactant selected from the group consisting of an amphoteric co-surfactant, a zwitterionic co-surfactant, and mixtures thereof; and B) a cationically modified inulin compound comprising a cationic modification; wherein the detergent composition has a pH from 8.0 to 10.0, and the composition is free of a fatty acid.

2. The liquid hand dishwashing detergent composition according to claim 1, wherein the cationic modification comprises a substituted ammonium group.

3. The liquid hand dishwashing detergent composition according to claim 2, wherein the substituted ammonium group is a quaternary ammonium group.

4. The liquid hand dishwashing detergent composition according to claim 3, wherein the quaternary ammonium group is a quaternary ammonium group substituted with at least one C1-C18 alkyl group.

5. The liquid hand dishwashing detergent composition according to claim 3, wherein the quaternary ammonium group is a quaternary ammonium group substituted with at least one C1-C4 alkyl group.

6. The liquid hand dishwashing detergent composition according to claim 1, wherein the cationically modified inulin compound is characterized by one or more of the following i-v:

i. a weight average degree of polymerization of at least 5;

ii. a weight average molecular weight of from 500 to 25,000 daltons;

iii. derived from an inulin backbone having a weight average molecular weight of from 500 to 25,000 daltons, determined prior to substitution with the least one positively charged organic group;

iv. a degree of substitution of from 0.01 to 3.0; and v. a cationic charge density (or "CCD") of from 0.05 to 12 meq/g.

7. The liquid hand dishwashing detergent composition according to claim 1, wherein the cationic modification comprises a substituted quaternary ammonium hydroxyalkyl group.

8. The liquid hand dishwashing detergent composition according to claim 1, wherein the cationic modification comprises a trimethylammonium hydroxyalkyl group.

9. The liquid hand dishwashing detergent composition according to claim 1, wherein the detergent composition comprises from 0.01% to 5%, by weight of the detergent composition, of the cationically modified inulin compound.

10. The liquid hand dishwashing detergent composition according to claim 1, wherein the composition comprises from 6.0% to 40%, by weight of the detergent composition, of the surfactant system.

11. The liquid hand dishwashing detergent composition according to claim 1, wherein the surfactant system comprises at least 40%, by weight of the surfactant system, of the anionic surfactant.

12. The liquid hand dishwashing detergent composition according to claim 1, wherein the anionic surfactant comprises at least 70%, by weight of the anionic surfactant, of alkyl sulphate anionic surfactant.

13. The liquid hand dishwashing detergent composition according to claim 1, wherein the anionic surfactant comprises at least 70%, by weight of the anionic surfactant, of alkyl alkoxy sulphate anionic surfactant.

14. The liquid hand dishwashing detergent composition according to claim 1, wherein the anionic surfactant comprises an alkyl sulphate anionic surfactant or an alkyl alkoxy sulphate anionic surfactant having a weight average degree of branching of at least 10%.

15. The liquid hand dishwashing detergent composition according to claim 1, wherein the anionic surfactant and the co-surfactant are present in a weight ratio of from 1:1 to 8:1.

16. The liquid hand dishwashing composition according to claim 1, wherein the co-surfactant is an amphoteric surfactant.

17. The liquid hand dishwashing composition according to claim 1, wherein the co-surfactant is a zwitterionic surfactant.

18. The liquid hand dishwashing composition according to claim 1, wherein the surfactant system further comprises a nonionic surfactant.

19. A liquid hand dishwashing detergent composition comprising:

a. from 5.0% to 50% by weight of the liquid hand dishwashing detergent composition of a surfactant system, wherein the surfactant system comprises:

i. anionic surfactant selected from the group consisting of alkyl sulphate surfactant, alkyl alkoxy sulphate surfactant, alkyl sulphonate surfactant, alkyl sulphosuccinate and dialkyl sulphosuccinate ester surfactants, and mixtures thereof; and ii. co-surfactant selected from the group consisting of amphoteric co-surfactant, zwitterionic co-surfactant, and mixtures thereof; and b. a cationically modified inulin compound comprising a cationic modification that comprises a substituted ammonium group, wherein the substituted ammonium group is a quaternary ammonium group substituted with a trimethylammonium group;

wherein the detergent composition has a pH from 8.0 to 10.0.

* * * * *